E. G. Covel,
Water Wheel,
No 3,449.    Patented Feb. 20, 1844.
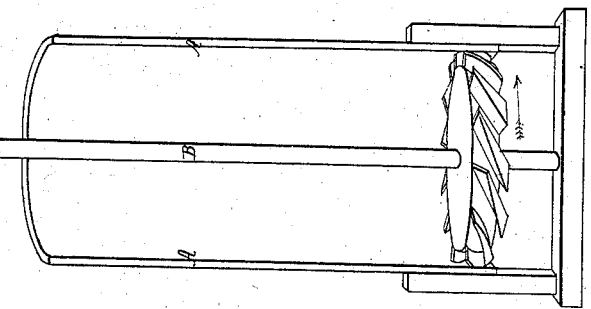
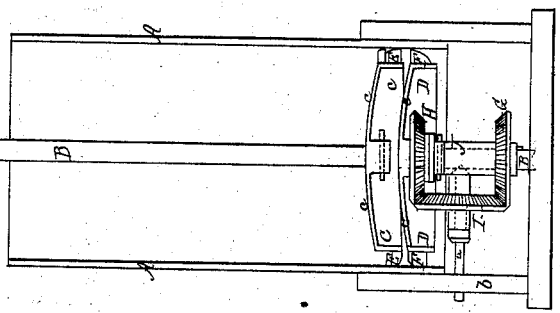
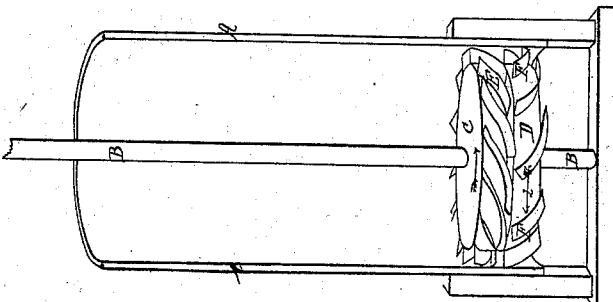
Inventor:
Emerson, G, Covel

UNITED STATES PATENT OFFICE.

EMERSON G. COVEL, OF GLENS FALLS, NEW YORK.

IMPROVEMENT IN COMBINED WATER-WHEELS.

Specification forming part of Letters Patent No. 3,449, dated February 20, 1844.

*To all whom it may concern:*

Be it known that I, EMERSON G. COVEL, of Glens Falls, in the county of Warren and State of New York, have invented a new and useful Improvement in Water-Wheels, which may be applied to mills of any kind in which the power of water is to be employed for the driving of machinery; and I do hereby declare that the following is a full and exact description thereof.

The water-wheel as improved by me is divided horizontally into two section or parts—an upper and a lower. One of these parts, usually the upper, is made fast to a vertical shaft, which shaft extends up from the water-wheel through a flume or trunk, which is to contain the water. The two sections of the water-wheel are to revolve in reversed directions, the buckets which surround their peripheries being curved or inclined in such manner as to produce this effect.

In the accompanying drawings, Figure 1 is a perspective representation of my water-wheel, a portion of the flume being removed for the purpose of exhibiting it. Fig. 2 is a vertical section through the flume and through the middle of the two sections of the wheels and of the gearing by which they are connected with each other. Fig 3 is a similar view to that given in Fig. 1, but showing one section of the wheel only, with the buckets thereon simply inclined, instead of being curved, as in Fig. 1.

A A is the flume or trunk for containing the water.

B is the vertical shaft; C, the upper and D the lower section of the water-wheel.

E and F are curved buckets attached to the two sections of the water-wheel and as nearly touching the inner periphery of the flume as may be. Each of the sections has a solid head or plate *c c c*, extending from its periphery to its center.

In Fig. 2 the gearing is shown by which the two sections of the wheel are connected together. The upper section C is supposed to be made fast to the shaft B, and the water acting upon it tends, of course, to turn said shaft. G is a bevel-wheel, which is also made fast to the shaft B, and H a similar wheel concentric with and made fast to the lower section D of the wheel. The shaft B passes through a collet or hole in the center of the section D and of the wheel H, so that this section and wheel would be loose upon the shaft, but for the gearing to be now described.

I is an intermediate bevel-wheel gearing into the wheels G and H. The wheel I revolves freely on a center-pin or arbor *a*, which extends out from and is made fast to a tube or collar J, through which the shaft B passes and within which it revolves, said collar remaining at rest. The outer end of the arbor *a* is sustained by the upright *b* or in any other convenient way. When the sections of the wheel are thus geared together, the power exerted upon them will be conveyed from one of them to the other, and the change of direction given to the effluent water will be found to economize the power communicated by it to a great extent.

In constructing the buckets of my wheel I prefer to give to them a curvature such as is shown in Fig. 1; but this curvature may be changed or their form may be such as will cause the descent of the water to be simply down an inclined plane, as shown in Fig. 3.

The curvature of the buckets E of the upper section of the wheel C resembles a Grecian cyma reversa and those lettered F of the lower section D a simple cavetto, arranged around the peripheries of the two sections of the wheel in such order as to gradually diminish the size of the issues from the inlets to the outlets, causing the water after having acted by what is termed "reaction" on the concavo-convex surfaces of the buckets E in turning the section C of the wheel in the direction of the arrow No. 1, Fig. 1, to then strike against the concave sides of the buckets F of the lower section D and act by percussion and reaction to turn it in the direction of the arrow No. 2 or in a reverse direction, thus transmitting its power, with that of the upper section C, through the intervention of the gearing above described, to the shaft B, from which the power is conveyed wherever desired.

What I claim as my invention, and which I desire to secure by Letters Patent, is—

Combining the section C of the water-wheel, having cyma reversa buckets E and contracted issues, with the section D, having concave or cavetto-shaped buckets F, the two sections being geared together by bevel-gearing and turning in contrary directions in a cylindrical flume by the reaction and percussion of the water confined in said flume, as herein set forth.

EMERSON G. COVEL.

Witnesses:
WM. P. ELLIOT,
ALBERT E. JOHNSON.